Patented Oct. 11, 1932

1,882,377

UNITED STATES PATENT OFFICE

THEODORE WHITTELSEY, OF RINGOES, NEW JERSEY

METHOD AND MEANS FOR REGULATING THE GROWTH OF PLANTS

No Drawing.        Application filed September 28, 1928. Serial No. 309,125.

This invention relates to improvements in agriculture and in the growing of fruit and other trees, shrubs or plants, and vegetables, etc., and more particularly to mulches and to mulching. The invention includes improvements both in methods of mulching and in methods of producing mulches, as well as in the mulches themselves as new products.

The mulching of plants, etc. has long been known and practiced and various mulches have been employed. More recently, mulches have been prepared of asphalt impregnated paper in standard widths which are laid between the rows of plants, or which are perforated to provide openings therein for the plants. In general, the use of mulches of various kinds has for its purpose to prevent the growth of weeds or to retard their growth, to promote the growth of the plant desired, to hold moisture in the soil and prevent baking of the surface and drying out of the soil, etc.

The present invention provides improvements in methods of mulching, and in the mulches themselves, as well as in methods of preparing them.

The present invention provides improved mulches having improved heat insulation properties.

The present invention also provides mulches and methods of mulching whereby different soils and different conditions of climate, etc. may be provided for, and whereby local conditions may be met and conditions of light, heat and moisture of the soil controlled in a predetermined manner.

The present invention also provides for the production of mulches from materials which in many cases are locally accessible at or near the location where the mulches are to be employed.

The invention also includes improved methods of making and applying conditioned mulches whereby the mulch is produced in situ at the place where it is to be employed, instead of preforming it in standard weights and widths as in the case of paper mulches heretofore used. The invention also includes improvements in the preparation of prepared mulches which are to be prepared before they are applied to the soil as mulches.

The nature and advantages of the invention, in its various embodiments and aspects, will more fully appear from the following more detailed description, but it is intended and will be understood that the description is illustrative of the invention and that the invention is not limited thereto.

In one application of my invention, I produce and apply the mulches in situ at the place where they are to be employed. This may be done according to various methods of procedure. In general, the method of procedure involves the distribution of the materials and ingredients which go to form the mulch upon the ground at the place where the mulch is desired, with admixture or combination of the ingredients at or after application so that together they form a mulch of regulated composition and properties. The mulch may be made from ingredients which in whole or in part are liquid or flowable and which can be sprayed or sprinkled or squirted onto the ground, or on to a covering layer of fibrous or other material.

Where the mulch is made up in whole or in part of dry materials, or semi-dry materials, which are self-binding or which are to be subsequently bound together by the application of a binder, the dry material can be blown or sifted or sprinkled onto the ground either alone or in admixture with liquid binding materials, etc.

Where the mulch is made up in part of dry materials and in part of liquid materials, these materials may be applied successively, for example, by sprinkling or blowing the dry material onto the ground, or otherwise covering the ground with the dry material, and then spraying or sprinkling the liquid material thereon to coat the same or to bind the particles of the same together, or the dry materials may be blown and simultaneously moistened by a cooperative spray of a binding or water-proofing liquid.

The dry material may in some cases be in the form of sheets or rolls of paper or other fibrous materials, applied in an uncoated or unwaterproofed condition and subjected to a waterproofing or other coating treatment after application, or during the period of application as the paper is unrolled from the reel.

The present invention provides for making mulches of various comminuted material, particularly fibrous materials which are available locally at or near the place where the mulches are desired. As such comminuted or fibrous material may be mentioned waste paper, bagasse, straw, vegetable trash, sawdust, or other vegetable waste. Such materials may be distributed over the ground either in an untreated condition, or after preliminary treatment with a waterproof binder or with simultaneous treatment of the same, and after application to the ground they may be further sprinkled or coated with suitable water repellant or waterproofing and binding liquids.

In the continuous application of such mulches, the liquid or waterproofing materials, or the fibrous or comminuted materials, or both, can be applied continuously, either simultaneously or in succession, so as to produce the mulch in a continuous and regulated manner, so that the thickness of the mulch, as well as its composition, can be regulated to meet local conditions.

The waterproofing materials which are employed in making the new mulches may be suitable oils, asphalt preparations, waxes which may be used as such or in the form of solutions or emulsions, rubber latex or emulsions or dispersions of rubber, or other suitable waterproofing materials. Such waterproofing materials may be used alone or in suitable admixture and, depending upon their condition, may in some cases be applied by sprinkling or spraying or flowing, or in other cases may be first admixed with comminuted material to form a plastic which is applied in a plastic state; while in other cases the fibres or finely divided materials may be admixed with binding liquids to form a semi-moist mixture which can then be blown onto the ground in regulated amounts to form a mulch of regulated thickness.

In applying the mulch, when it is of a plastic character, spraying machines may be employed such as are used for spraying plaster or insulating materials for building purposes.

One of the advantages of the present invention is that it enables the thickness as well as the width of the mulch to be readily regulated. By regulating the thickness of the mulch, its insulating properties can be regulated and controlled. Moreover, by making the mulch of a porous or cellular character, and by trapping air in it, its insulating properties can be greatly increased. The purpose of trapping air in the mulch is to produce a heat-insulating layer to retain heat in the ground. One example of preparing a mulch and trapping air in the mulch is to blow comminuted fibrous material onto the ground and mix it with water proofing material insufficient in amount to fill up all the voids. The air filled voids which result serve as heat insulation. Where a cellular or foamy insulation is required, the material employed may be in the form of a foam, or may contain ingredients which will react with each other to generate gases and form foam in the material after it is applied to the ground, or to a layer of fibrous or other materials thereon. Where porous materials are employed having channels through which water could pass, they should in most cases be waterproofed at the surface of the mulch to seal the channels and keep out water.

In general, the waterproofing materials will not be employed alone, but will be employed in conjunction with carriers therefor, or applied after a layer of a suitable carrying material has been previously applied to the ground. As carriers which may be admixed with the waterproofing materials in various proportions may be mentioned inorganic materials such as lime, gypsum, sand or earth and the like, or diatomaceous earth or other materials which have large bulk for small weight due to admixed air, organic materials such as comminuted paper, rags, plant waste, bagasse, fibres of various kinds, both wood and pulp, or ground or semi-digested wood or other fibres. Cornstalks, for example, after disintegration may be employed together with suitable adhesive and waterproofing or water repellant material.

Where fibrous or other materials are employed in conjunction with a waterproofing liquid, the fibrous material need not be thoroughly impregnated with waterproofing material, but it may be merely coated on the outside, or coated on top with a waterproofing layer.

In general, a black mulch is preferable, for the purpose of preventing weed growth by cutting off sunlight and of raising the soil temperature by absorbing the heat of the sun's rays. To these ends, a black material may be employed for the waterproofing, or black materials will be incorporated with other ingredients. Black pigments, such as lamp black, carbon black, etc. can be employed in conjunction with suitable waterproofing liquid. Asphalt preparations or solutions can also be employed. Crude petroleum oils or cheap coal tar or coal tar oils or in some cases vegetable oils can be employed, either alone or in admixture with other materials, as waterproofing agents. Rubber emulsions, rubber dispersions, or rubber latex, where available locally, can be employed as the waterproofing material, for example, by applying to a layer of fibrous material to waterproof the same either partially or completely.

In some cases, where the matter of heat insulation is less important, the waterproofing materials either alone or with admixtures may be sprinkled directly on the prepared soil surface; or such waterproofing materials may be employed after there has been first applied to the soil a layer of fibrous or other material.

In some cases it will prove of advantage to form an earth mulch by tillage and preserve the effectiveness of this by applying a waterproof liquid to its surface, thus preventing puddling of the soil by rain with subsequent drying-out and baking of the surface into a hard crust, while allowing some access of air and water to the sub-surface soil through the interstices in the rough surface produced by tillage.

It is not essential that the mulch should in all cases be completely waterproof. In fact, it may be more advantageous in some cases to have a mulch which is porous and in which the access of water to the soil is decreased but which is of sufficient thickness and of such structure and composition that it will prevent light from reaching the soil therethrough. In such case, the water can permeate through the porous mulch, but sunlight is prevented from passing therethrough. With fibrous or cellular materials such as bagasse and straw, there will naturally be air spaces which will add to the insulating properties of the mulch.

It will thus be seen that when the mulch is produced in situ it can be of varying thickness and varying heat insulating properties, as well as of varying porosity; and that such mulches can be produced either by the use of dry materials, such as fibrous bagasse, etc. with subsequent treatment of the surface of the mulch, by coating, waterproofing, etc.; or that the fibrous or other materials can be first treated with the waterproofing material and then sprayed, blown, squirted or otherwise applied in the form of a plastic or flowable or blowable material. If such materials are not compounded with waterproofing materials, they may nevertheless be applied in a flowable or blowable condition and subsequently treated on their surfaces with suitable waterproofing materials.

The present invention also includes improvements in mulches which contain chemical ingredients such as weed killers, fungicides, or insecticides; as well as with materials which have a preservative effect upon the fibres, etc. of the mulch and prevent or retard decaying thereof. Appropriate chemicals may thus be employed to repel mice or insects or fungus growths.

The production and application of the mulch in situ can advantageously be combined with the planting of the ground, for example, by applying the mulch with the same machine which plants the seeds. A planting machine may thus harrow the land, smooth and shape its surface, open the soil for planting, insert the seed or seedling, cover up the seed or firm the ground around the seedling, etc., and, simultaneously therewith, the machine may apply the materials which go to form the mulch, spraying or otherwise discharging them upon the ground between the rows of seeds. In this way, the ground between the rows can be thoroughly and uniformly mulched, leaving the narrow strip of ground which is planted free from mulch or the planting member of the machine may be provided with a flange which protects the planted spot during the application of the mulch, which thus may be distributed if desired over the whole planting area except at the spots immediately around each plant. By combining the planting and the application of mulch in this way, the thickness of the mulch can be regulated, as well as its composition, and the planting and mulching is completed in a single operation.

Where it is desired to protect the land from the erosion produced by heavy rainfalls, the contour of the land may be so shaped as to form gutters, at appropriate intervals, which, after the application of the mulch to the land, will provide waterproof troughs for the conduction away of the run-off. In climates where it is important to conserve the rainfall similar gutters may be used to direct the water to the planted strips between mulched areas, or to apertures in the mulch surrounding the plants or to implanted strips between mulched rows, as may be desired.

Instead of producing the mulch in situ, it may in some cases be preformed and applied in a preformed state. For example, blankets having insulating properties, and which may be more or less porous, and of regulated thickness, may be manufactured with sufficient strength to withstand shipment and handling, and then transferred to the place of use and applied to the soil. They may be waterproofed throughout, or coated with a waterproofing material only on the upper surface. Such blankets may be made, for example, of fibrous material with suitable waterproofing binders and may have supporting layers of paper or other material; or they may be coated on one side with a waterproofing material. They may also be treated with suitable anti-rot materials, insect repellant chemicals, fungicides, etc. Such insulating blankets may be made with entrapped air, or of fibrous materials such as bagasse or straw which contain air, and which have important insulating properties.

Preformed porous blankets which are suitably waterproofed have much the same properties as blankets formed in situ from porous fibrous materials which are subsequently waterproofed in situ. Where the blanket is preformed but is not waterproofed before it is applied to the soil, it may be waterproofed much the same as a blanket formed in situ is waterproofed, for example, by spraying it with an asphalt preparation or with latex, an emulsion of rubber or other waterproof material so as to waterproof the blanket in situ. Such insulating blankets can be readily produced from paper pulp, or a pulp of fibres of various kinds, impregnated with an asphalt preparation, or with rubber emulsion or dispersion or with latex, in such proportions that when the mixture is employed for producing a blanket, whether preformed or formed in situ, there will be produced a blanket which is waterproof and porous and sufficiently thick to give the desired heat insulating properties. By regulating the thickness and other properties of the blanket, it is possible to control the heat, moisture, light and soil erosion in a predetermined way which can be adapted to particular conditions locally prevailing.

Fibres or comminuted material, as from waste paper, may be air-blown in a dry condition, the stream being simultaneously sprayed from cooperative members with a binder as sodium silicate, rosin emulsion, rosin soaps, aluminum soaps, paraffine, latex or other binding or water-repellant or waterproofing material. In this and other forms of this invention the binder need not be waterproof if the surface of the mulch or blanket is waterproofed.

The raw materials employed in making the blanket or in making the mulch may vary greatly, depending upon the locality, and the available supply of raw materials. On sugar cane plantations, the waste bagasse is available in large amounts as a fibrous material which can be employed, with such further treatment to convert it into fibres of suitable properties, in making the mulch. Where wheat straw or other grain straws are available, they can be similarly employed, either in their natural state, or after further disintegration to produce a fibrous pulp or fibrous mass which can then be employed in making the mulch. Where cornstalks or corn husks are available, they can be similarly employed. Where waste paper or comminuted paper is available in quantity, it may be used to advantage. Such fibrous or other materials can be made into a pulp with a suitable waterproofing material such as an asphalt emulsion, or they can be made into a blanket and applied and subsequently treated with an asphalt emulsion to waterproof them, or they can be applied to the ground in the form of loose fibres to form a layer which is then treated with an asphalt emulsion or other water proofing material.

On rubber plantations, or where rubber emulsions or latex are available, they can be employed as the waterproofing materials, together with such fibrous materials as may be locally available. In such cases, the fibrous materials may be preformed into sheets of paper or of fibres, by admixing the fibres with the rubber emulsion or latex and forming a sheet therefrom which is cured or which is dried and which contains sufficient rubber or latex to impart the desired waterproof properties. Or instead of admixing the fibrous material with the rubber emulsion or latex, it may be formed into sheets of paper or fibrous material and subsequently coated with the rubber emulsion or latex; or the ground may be first covered with the fibrous material and the layer of rubber emulsion or latex then applied thereto.

The binding or waterproofing materials employed may be such as set or harden or cure after they are applied in forming the mulch. Agents such as sodium silicate, gypsum, hydraulic cements, etc., when employed in water suspension will set or harden on drying. In case of linseed oil or other drying oils a drier may be employed to promote the drying and hardening of the oil film and this action will be promoted by the action of sunlight to which the mulch layer is exposed. With rubber or other vulcanizable materials, such as vulcanizable oils, the rubber or oil may be admixed with sulfur or other vulcanizing agent in suitable proportion and with an accelerator which will promote the vulcanization at the temperatures to which the mulch is subjected after it is applied. Where black pigments or other black ingredients are present in the mulch layer they will promote the adsorption of heat and increase the temperature of the layer and thereby promote vulcanization or curing of the rubber, etc. Even without the admixture of vulcanizing agents the rubber or other material may undergo curing or setting by the action of the sun's rays. In other cases, the waterproofing or binding material may be employed in solution or suspension in a menstruum which will be evaporated to leave the waterproofing and binding material in suitable condition without further curing or change. Where the mulch blanket is preformed before use, such setting, hardening, curing, or evaporation of menstruum will ordinarily be effected during the process of manufacture, but even in such cases there may be hardening or curing, etc., by heat and the sun's rays after the mulch is applied.

It will be evident that the present invention enables the mulching operation to be regulated and controlled to meet different climatic conditions, and different soil conditions. For hot arid climates, it is especially important to conserve the moisture. This can readily be obtained with the waterproof mulches of the present invention. For temperate climates, particularly where there is abundant rain fall, conservation of moisture is less important, but elevation of soil temperature is desirable. This is obtained by the heat insulating properties of the porous mulches of the present invention. Clay soils require somewhat different protection by mulch than sandy soils. In some cases mulches which are semi-permeable to water are better than those which are entirely waterproof. Some crops are affected more favorably than others by a standardized mulch. It is therefore desirable to provide mulches which can be made and applied by the planter with qualities which can be adapted to the climate, soil and crops. The present invention enables the mulch to be controlled and regulated.

It will thus be seen that the present invention provides for improved mulches, and improved methods of producing mulches, both before they are applied to the ground, and as a part of the process of application; and that the new mulches and methods of mulching present many advantages, making possible the regulation or control of temperature, moisture, light and other soil conditions in an advantageous manner.

I claim:—

1. The method of preparing a mulch, which comprises applying to the ground fibrous materials and waterproofing materials and thereby forming a mulch from such materials in situ on the ground, the fibrous materials and waterproofing materials being admixed with each other before being applied.

2. The method of preparing a mulch, which comprises forming a porous sheet of cellular material, applying such sheet to the ground and simultaneously waterproofing the same on one side to leave a cellular waterproofed sheet.

3. The method of preparing a mulch, which comprises admixing fibres with rubber in a dispersed state and forming the resulting mixture into a sheet and applying the same as a mulch.

4. A mulch comprising a sheet of fibrous material, waterproofed with rubber in a dispersed state.

5. The method of planting and mulching in a single operation which comprises preparing the ground and applying the seeds or plants and simultaneously applying to the ground the ingredients of the mulch in a mobile condition and thereby forming the mulch on the ground simultaneously with the planting operation.

6. The method of preparing a mulch which comprises blowing dry materials onto the ground and simultaneously moistening the same by spraying with a binding material and thereby causing the particles of comminuted material to cohere with the formation of air-filled voids.

7. The method of preparing a mulch in situ which comprises continuously applying to the ground comminuted fibrous materials and waterproofing materials to form a composite mulch in a continuous manner, said mulch comprising the fibrous materials and the waterproofing ingredients.

8. The method of preparing a mulch in situ which comprises continuously applying to the ground a preformed porous blanket of fibrous material and simultaneously waterproofing the blanket to form a waterproof mulch layer.

9. The method of producing and applying a mulch which comprises planting the seeds in a continuous manner and simultaneously applying to the ground the ingredients of the mulch in a disseminated state to form a mulch between the spaces where the seeds are planted, whereby the planting and mulching operations are carried out continuously and simultaneously without interfering with the growth of the seeds.

10. The method of preparing a mulch which comprises applying to the ground in a disseminated state fibrous materials, vulcanizable materials and a vulcanizing agent, whereby a mulch is produced capable of vulcanization on exposure to sunlight.

11. The method of preparing a mulch in situ, which comprises admixing fibrous materials and waterproofing materials and continuously applying the admixture to the ground to form a composite mulch, said mulch comprising the fibrous materials and the waterproofing materials.

12. The method of preparing a mulch in situ, which comprises continuously applying to the ground comminuted fibrous materials and waterproofing materials in such a way as to form a porous mulch containing air-filled voids.

13. The method of preparing a mulch, which comprises admixing vegetable fibers with latex and forming the resulting mixture into a sheet and applying the same as a mulch.

14. The method of preparing a mulch, which comprises blowing dry comminuted fibrous materials onto the ground and simultaneously moistening the same by spraying with a waterproofing material and thereby causing the particles of comminuted material to cohere with the formation of air-filled voids.

15. The method of preparing a mulch in situ, which comprises applying comminuted fibrous materials to the ground and as a part of the same operation sprinkling the fibrous material with liquid waterproofing material so as to form a layer of the fibrous material on the ground with a covering of waterproofing material.

16. The method of preparing a mulch in situ, which comprises applying fibrous materials to the ground and simultaneously sprinkling the fibrous material with liquid waterproofing material so as to form a layer of the fibrous material on the ground with a covering of waterproofing material.

17. The method of preparing a mulch, which comprises admixing paper pulp with rubber in a dispersed state, forming the resulting mixture into a sheet of paper and then applying the sheet as a mulch.

18. A mulch comprising a sheet of paper waterproofed with rubber.

19. A mulch comprising a porous coherent sheet of fibrous material, said sheet having a top coating of waterproofing material.

20. A mulch comprising a waterproofed porous coherent sheet of fibrous material.

21. A mulch comprising fibrous materials and rubber.

22. A mulch comprising fibrous materials, rubber and a vulcanizing agent.

23. A mulch comprising a sheet of rubberized fibrous materials.

24. The method of preparing a water-repellant mulch, which comprises applying fibrous materials and liquid waterproofing materials to the ground continuously and in such a way as to form a porous layer of the fibrous and waterproofing material in a single operation.

25. The method of preparing a mulch, which comprises covering the ground with fibrous material and rubber in the form of rubber latex or other rubber dispersion to form a waterproofed composite mulch.

26. A mulch comprising a layer containing air filled voids, said layer containing water proof binding material distributed through it.

27. A mulch comprising fibrous materials containing air filled voids and having a water proof binding material distributed through it.

28. A mulch comprising a porous coherent sheet of fibrous material, said sheet having an outside coating of waterproofing material.

29. A water proof mulch comprising a porous coherent sheet of fibrous material, said mulch containing an anti-rot material.

30. A water proof mulch comprising a porous coherent sheet of fibrous material, said mulch containing an insect repellent chemical.

31. A water proof mulch comprising a porous coherent sheet of fibrous material, said mulch containing a fungicide.

In testimony whereof I affix my signature.

THEODORE WHITTELSEY.